United States Patent
Ishigaya et al.

(10) Patent No.: US 12,209,450 B2
(45) Date of Patent: Jan. 28, 2025

(54) ONE-WAY DAMPING HINGE

(71) Applicant: SUGATSUNE KOGYO CO., LTD., Tokyo (JP)

(72) Inventors: Kazuyuki Ishigaya, Tokyo (JP); Hiroaki Kawawa, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 4 days.

(21) Appl. No.: 18/040,761

(22) PCT Filed: Jul. 8, 2021

(86) PCT No.: PCT/JP2021/025734
§ 371 (c)(1),
(2) Date: Feb. 6, 2023

(87) PCT Pub. No.: WO2022/030173
PCT Pub. Date: Feb. 10, 2022

(65) Prior Publication Data
US 2023/0279710 A1   Sep. 7, 2023

(30) Foreign Application Priority Data

Aug. 6, 2020 (JP) ................................. 2020-133722

(51) Int. Cl.
*E05F 5/02* (2006.01)
*E05D 3/02* (2006.01)
(Continued)

(52) U.S. Cl.
CPC ............... *E05F 5/02* (2013.01); *E05D 3/02* (2013.01); *E05D 7/0045* (2013.01); *E05D 11/08* (2013.01);
(Continued)

(58) Field of Classification Search
CPC . E05F 5/02; E05D 3/02; E05D 7/0045; E05D 11/08; E05D 2003/027;
(Continued)

(56) References Cited

U.S. PATENT DOCUMENTS 1,956,040 A * 4/1934 Meyer .................... E05D 11/081
16/340
5,109,571 A * 5/1992 Ohshima ................. E05D 11/08
16/284

(Continued)

FOREIGN PATENT DOCUMENTS

CN  102741571 B * 1/2015 ............. E05D 11/08
JP  8-270301 A  10/1996
(Continued)

OTHER PUBLICATIONS

ISA/JP, International Search Report (with English translation) and Written Opinion mailed on Sep. 21, 2021, in International Application No. PCT/JP2021/025734, 9 pages with translation.
(Continued)

*Primary Examiner* — Christine M Mills
*Assistant Examiner* — Matthew J Sullivan
(74) *Attorney, Agent, or Firm* — MASUVALLEY & PARTNERS; Peter Martinez

(57) ABSTRACT

A one-way braking hinge capable of self-aligning a shaft and a one-way clutch is provided. The one-way braking hinge (10) includes a first leaf (1), a shaft (3) rotatably supported by the first leaf (1), at least one resistance part (4) that resists rotation of the shaft (3), a second leaf (2) rotatably coupled to the shaft (3), a one-way clutch (12) into which the shaft (3) is inserted, and a position adjusting member (11) to which the one-way clutch (12) is fixed. The position adjusting member (11) is position-adjustably coupled to the second leaf (2).

6 Claims, 15 Drawing Sheets

(51) Int. Cl.
  *E05D 7/00*   (2006.01)
  *E05D 11/08*  (2006.01)
  *F16C 11/04*  (2006.01)
  *F16D 41/066* (2006.01)

(52) U.S. Cl.
  CPC ........ *F16C 11/04* (2013.01); *E05D 2003/027* (2013.01); *E05D 2011/088* (2013.01); *E05Y 2201/21* (2013.01); *E05Y 2201/216* (2013.01); *E05Y 2600/12* (2013.01); *F16D 41/066* (2013.01)

(58) Field of Classification Search
  CPC .. E05D 2201/088; F16C 11/04; F16D 41/066; E05Y 2201/21; E05Y 2201/216; E05Y 2600/12
  See application file for complete search history.

(56) References Cited

U.S. PATENT DOCUMENTS

| | | | |
|---|---|---|---|
| 5,566,048 A | 10/1996 | Esterberg et al. | |
| 5,566,424 A * | 10/1996 | Crompton | G06F 1/1601 |
| | | | 16/337 |
| 5,598,607 A * | 2/1997 | Katagiri | E05D 11/084 |
| | | | 16/337 |
| 6,570,627 B1 * | 5/2003 | Chang | G06F 1/1601 |
| | | | 348/836 |
| 7,065,829 B2 * | 6/2006 | Okabayashi | B60R 7/06 |
| | | | 16/354 |
| 9,121,213 B2 * | 9/2015 | Sakai | E05F 3/22 |
| 9,823,638 B2 * | 11/2017 | McBroom | F16D 71/00 |
| 10,711,498 B2 * | 7/2020 | Grewe | E05F 1/1016 |
| 10,890,950 B2 * | 1/2021 | Zhang | G06F 1/1681 |
| 11,023,017 B2 * | 6/2021 | Cheng | G06F 1/1681 |
| 11,067,136 B1 * | 7/2021 | Pavane | F16D 41/066 |
| 11,608,668 B2 * | 3/2023 | Hotomi | E05D 3/02 |
| 2011/0149510 A1 | 6/2011 | Monsalve et al. | |
| 2013/0283569 A1 * | 10/2013 | Lin | E05D 11/1007 |
| | | | 16/319 |
| 2017/0122018 A1 * | 5/2017 | Huang | E05D 5/06 |
| 2018/0259010 A1 * | 9/2018 | Ji | F16D 41/06 |
| 2019/0064886 A1 * | 2/2019 | Wendt | G06F 1/1679 |
| 2021/0095506 A1 * | 4/2021 | Jeong | E05F 3/14 |
| 2021/0095510 A1 * | 4/2021 | Lee | E05F 1/1215 |
| 2021/0293270 A1 * | 9/2021 | Zhu | F16C 11/04 |
| 2022/0355779 A1 * | 11/2022 | He | F16D 65/16 |

FOREIGN PATENT DOCUMENTS

| | | |
|---|---|---|
| JP | 3152248 U | 7/2009 |
| JP | 2017-172270 A | 9/2017 |
| KR | 20030090233 A | 3/1992 |
| WO | WO2011078885 A1 | 6/2011 |

OTHER PUBLICATIONS

EESR/EPO, The extended European Search Report issued on Dec. 14, 2023 in European Patent Application No. 21854284.3, 38 pages with translation.

* cited by examiner (a)

(b)

(a)

(b)

ONE-WAY DAMPING HINGE

RELATED APPLICATIONS

This application is the U.S. National Phase of and claims priority to International Patent Application No. PCT/JP2021/025734, International Filing Date Jul. 8, 2021; which claim benefit of Japanese Patent Application No. 2020-133722 filed Aug. 6, 2020 which is incorporated herein by reference in its entirety.

TECHNICAL FIELD

The present invention relates to a one-way braking hinge that freely rotates a rotating body such as a lid and a door in an opening direction and brakes in a closing direction.

BACKGROUND ART

There are some machines, buildings, furniture, electrical products, housings, and the like having rotating bodies such as lids, doors, windows, and the like that open and close in an up-down direction or a left-right direction.

These rotating bodies are made rotatable by hinges. The hinge comprises a first leaf, a second leaf, and a shaft rotatably coupling the first leaf and the second leaf. By coupling the first leaf to a main body and coupling the second leaf to the rotating body, the rotating body can be rotated with respect to the main body.

Conventional common hinges cannot brake the rotating body (i.e., cause the rotating body to close slowly or keep the rotating body stationary at an arbitrary opening angle). Therefore, a closing operation of the rotating body is shockingly performed.

In order to prevent this, Patent Document 1 discloses a one-way braking hinge that rotates the rotating body freely in the opening direction and brakes in the closing direction. This one-way braking hinge has a one-way clutch into which the shaft is inserted. The one-way clutch accommodates a plurality of rolling elements such as needles and rollers in a plurality of wedge-shaped spaces formed between cam surfaces of an outer cylinder and a shaft.

According to this one-way braking hinge, when the rotating body rotates in the opening direction, the rolling elements move to a deep groove side of the cam surface, and the one-way clutch rotates freely with respect to the shaft. Therefore, the rotating body fixed to the one-way clutch freely rotates in the opening direction. On the other hand, when the rotating body rotates in the closing direction, the rolling elements enter a small diameter side of the cam surface, and the shaft rotates together with the one-way clutch. When the shaft rotates, a resistance part resists the rotation of the shaft and brakes the rotating body.

RELATED ART DOCUMENT

Patent Document

The Patent Document 1 is Japanese Utility Model Registration No. 3152248.

SUMMARY OF THE INVENTION

Problems to be Solved by the Invention

However, in conventional one-way braking hinges, if the shaft and the one-way clutch are not sufficiently aligned, there is a problem that durability of the one-way clutch is lowered. This is because if the shaft and the one-way clutch are misaligned, some of the wedge-shaped spaces become narrower and an excessive load acts on the rolling elements. In order to prevent this, it is necessary to improve mounting accuracy of the shaft and the one-way clutch.

The present invention has been made to solve the above problems and it is an object of the present invention to provide a one-way braking hinge capable of automatically aligning a shaft and a one-way clutch.

Means for Solving the Problems

In order to solve the above problems, one aspect of the present invention provides a one-way braking hinge including: a first leaf; a shaft rotatably supported by the first leaf; at least one resistance part that resists rotation of the shaft; a second leaf rotatably coupled to the shaft; a one-way clutch into which the shaft is inserted, and a position adjusting member to which the one-way clutch is fixed; wherein the position adjusting member is position-adjustably coupled to the second leaf.

Effects of the Invention

According to the present invention, self-alignment of the shaft and the one-way clutch is possible.

MODE FOR CARRYING OUT THE INVENTION

Hereinafter, a one-way braking hinge according to an embodiment of the present invention will now be described in detail with reference to the accompanying drawings. However, the one-way braking hinge of the present invention may be embodied in various forms and is not limited to the embodiments set forth herein. The present embodiments are provided with the intention of allowing those skilled in the art to fully understand the present invention through a thorough disclosure of the specification.

First Embodiment

Figure 1:
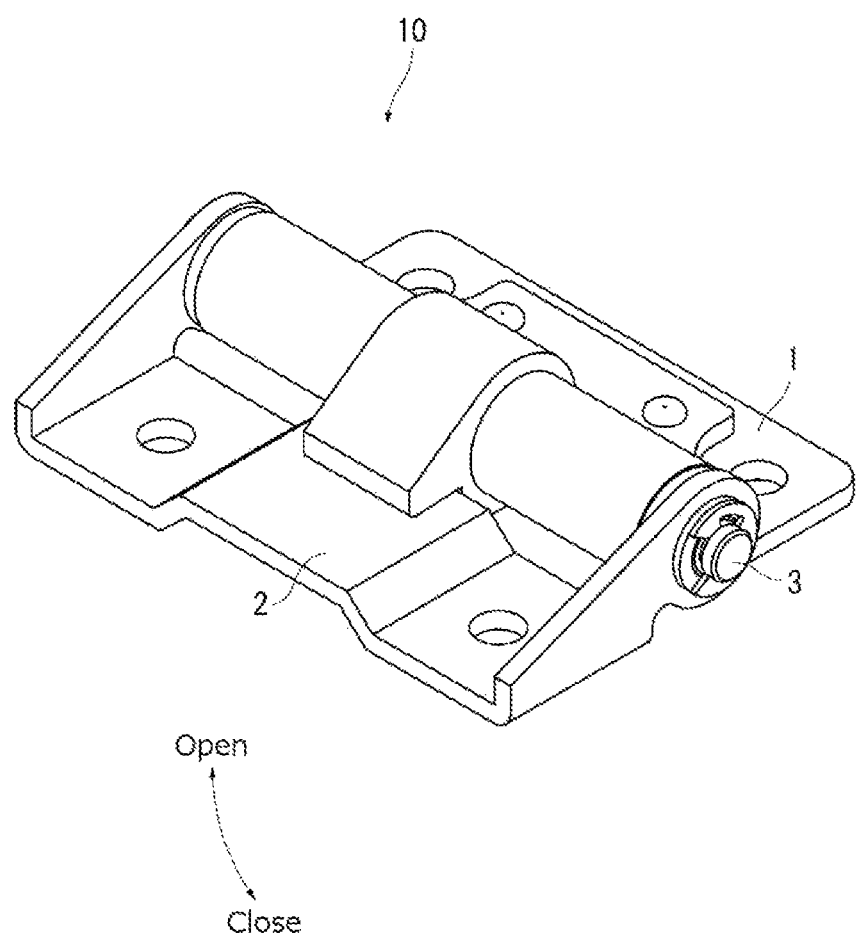
FIG. 1 is an external perspective view of a one-way braking hinge according to a first embodiment of the present invention.

FIG. 1 is an external perspective view of the one-way braking hinge according to a first embodiment of the present invention. The one-way braking hinge 10 of this embodiment includes a first leaf 1 having a plurality of mounting holes formed therein and a second leaf 2 having a plurality of mounting holes formed therein. The first leaf 1 and the second leaf 2 are substantially rectangular in plan view. Shapes of the first leaf 1 and the second leaf 2 are not particularly limited. The second leaf 2 is rotatable about a shaft 3 with respect to the first leaf 1. When the second leaf 2 rotates in an opening direction with respect to the first leaf 1, the second leaf 2 rotates freely. On the other hand, when the second leaf 2 rotates in a closing direction with respect to the first leaf 1, the rotation of the second leaf 2 is braked. In some cases, when the second leaf 2 rotates in the closing direction relative to the first leaf 1, the second leaf 2 rotates freely, and when the second leaf 2 rotates in the opening direction, the rotation of the second leaf 2 may be braked.

Figure 2:
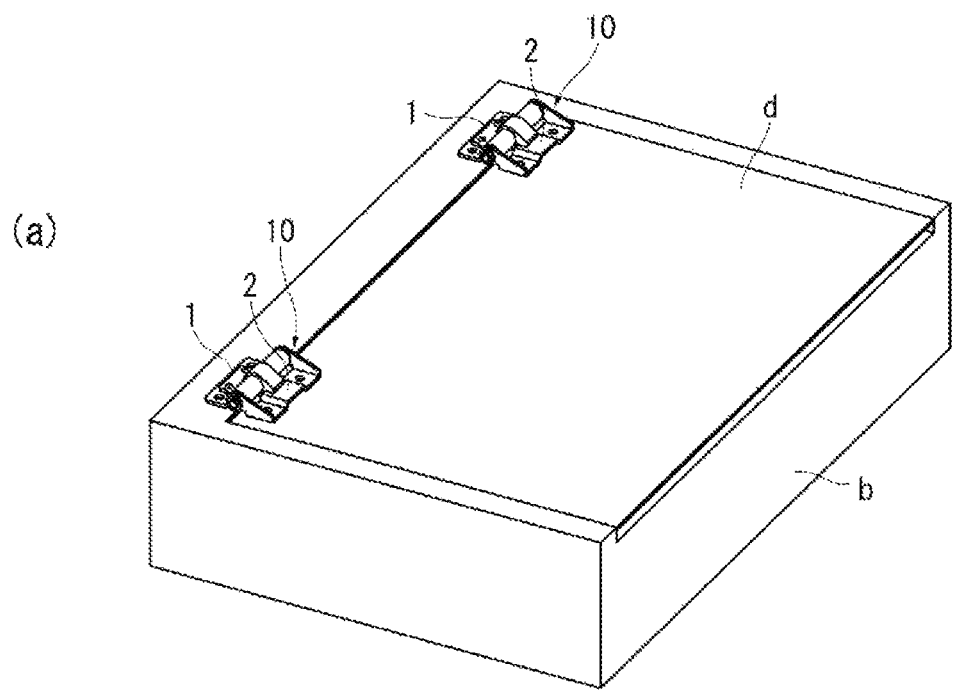
FIGS. 2(a) and 2(b) are diagrams showing an example in which the one-way braking hinge of the present embodiment is attached to a housing (FIG. 2(a) shows a closed position of a lid body, and FIG. 2(b) shows a halfway open position of the lid body).
Figure 2:
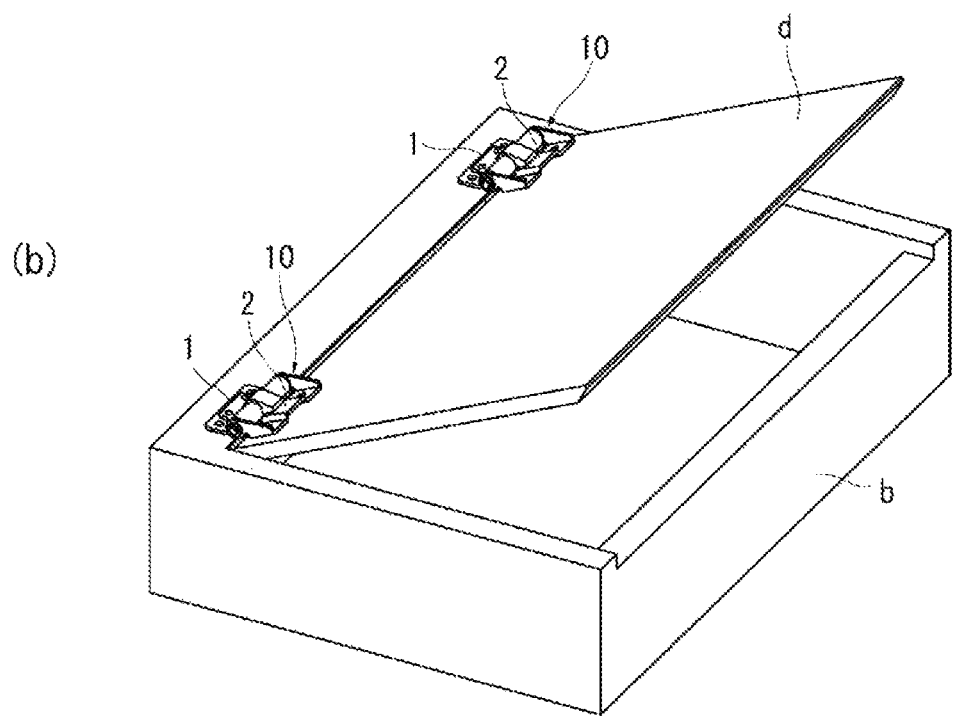

FIG. 2 shows an example in which the one-way braking hinge 10 of this embodiment is attached to a housing. FIG. 2(a) shows a closed position of a lid body d, and FIG. 2(b) shows the halfway open position of the lid body d. The first leaf 1 is attached to a main body b. The second leaf 2 is attached to the lid body d as a rotating body. The lid body d rotates freely in the opening direction. On the other hand, the rotation of the lid body d in the closing direction is braked, and the lid body comes to rest at an arbitrary opening position. Instead of the lid body d resting at the arbitrary opening position, the lid body d may slowly close to the closed position.

Figure 3:
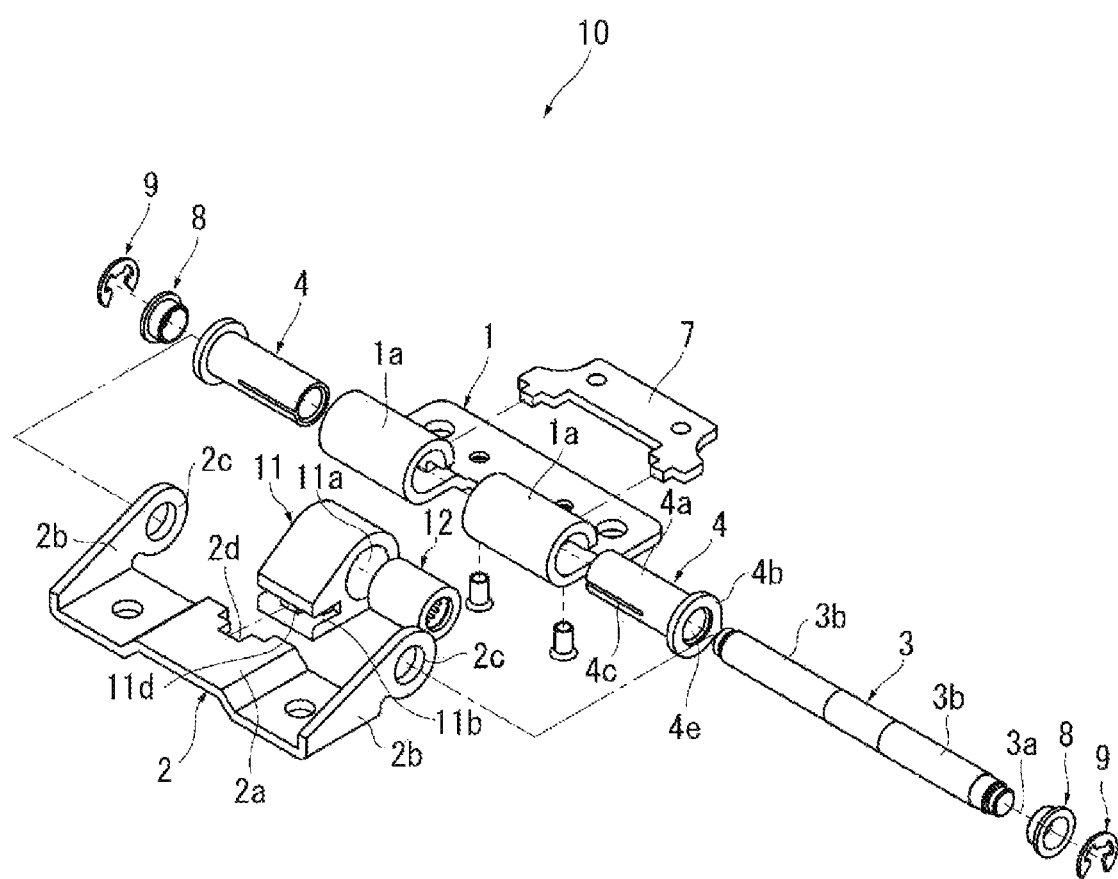
FIG. 3 is an exploded perspective view (exploded perspective view seen from a side of a second leaf) of the one-way braking hinge of the present embodiment.
Figure 4:
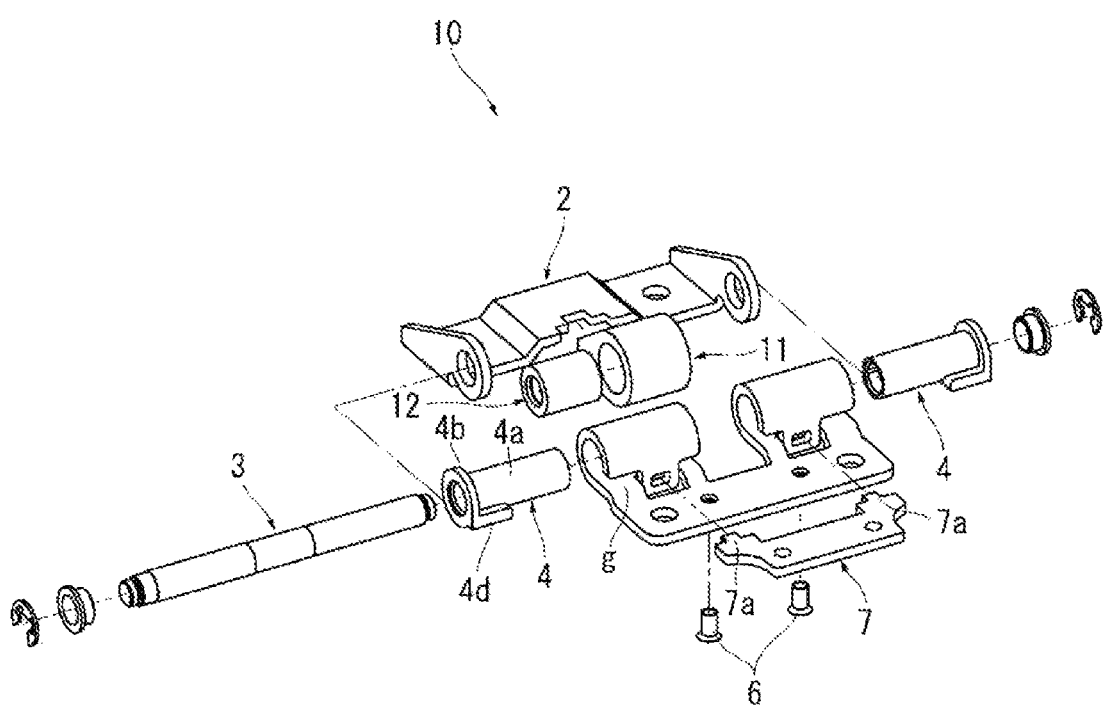
FIG. 4 is an exploded perspective view (exploded perspective view seen from a side of a first leaf) of the one-way braking hinge of this embodiment.

FIGS. 3 and 4 are exploded perspective views of the one-way braking hinge 10 of this embodiment. FIG. 3 is an exploded perspective view seen from a side of the second leaf 2, and FIG. 4 is an exploded perspective view seen from a side of the first leaf 1. As shown in FIG. 3, the first leaf 1 has a pair of cylindrical portions 1a at an end on the side of the second leaf 2. The cylindrical portion 1a is formed, for example, by bending an extension portion of the first leaf 1 into a curl shape. A sleeve-shaped resin-made frictional resistance part 4 as a resistance part is non-rotatably fitted to the cylindrical portion 1a. The shaft 3 is rotatably fitted in the frictional resistance part 4. The frictional resistance part 4 is non-rotatably fixed to the first leaf 1. The shaft 3 is rotatable about its center line 3a with respect to the frictional resistance part 4. The shaft 3 is horizontally supported by the cylindrical portion 1a of the first leaf 1.

The frictional resistance part 4 includes a tubular body portion 4a and a flange portion 4b formed at one end of the body portion 4a. The body portion 4a of the frictional resistance part 4 is press-fitted into the cylindrical portion 1a of the first leaf 1. The body portion 4a of the frictional resistance part 4 is formed with a slit 4c for facilitating press-fitting into the cylindrical portion 1a. As shown in FIG. 4, the flange portion 4b of the frictional resistance part 4 is provided with an axial projection 4d that fits into a gap g formed at a tip of the cylindrical portion 1a of the first leaf 1. A locking member 7 is fixed to the first leaf 1 by a fastening member 6 such as a caulking pin. The locking member 7 is formed with protrusions 7a that fit into holes of the cylindrical portion 1a and presses the frictional resistance part 4. The locking member 7 fixes the frictional resistance part 4 to the cylindrical portion 1a of the first leaf 1 so as not to rotate.

As shown in FIG. 3, the shaft 3 is press-fitted into the frictional resistance part 4. An outer peripheral surface 3b of the shaft 3 and an inner peripheral surface 4e of the frictional resistance part 4, which are in contact with each other, serve as friction surfaces. The frictional resistance part 4 resists the rotation of the shaft 3 and brakes the rotation of the shaft 3.

The frictional resistance part 4 may be composed of a curved portion having an arcuate cross section and extension portions projecting outward from both ends of the curved portion. Bolts may be passed through the extension portions, and the curved portion of the frictional resistance part 4 may tighten the shaft 3 by means of an adjustment nut screwed between the bolts.

Figure 6:
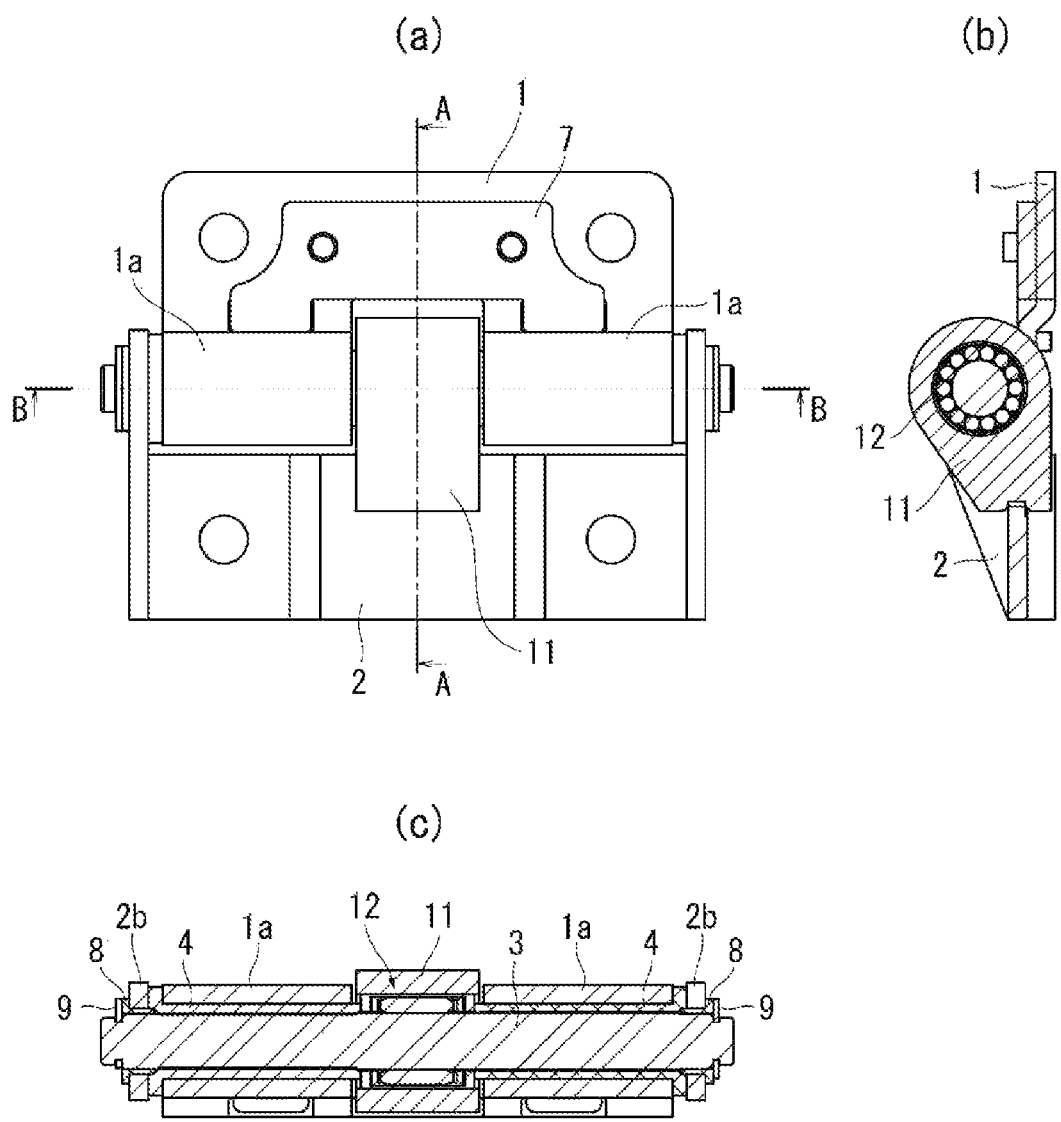
FIGS. 6(a), 6(b) and 6(c) are detailed views of the one-way braking hinge of this embodiment (FIG. 6(a) is a plan view, FIG. 6(b) is a cross-sectional view taken along line AA of FIG. 6(a), and FIG. 6(c) is a cross-sectional view taken along line BB of FIG. 6(a)).

The second leaf 2 includes a substantially rectangular body portion 2a and bearing portions 2b that are formed parallel to each other at both axial ends of the body portion 2a and protrude toward the first leaf 1. By fitting the bearing portions 2b of the second leaf 2 to the shaft 3, the second leaf 2 is rotatably coupled to the shaft 3. Flanged washers 8 made of resin are fitted in holes 2c of the bearing portions 2b (see FIG. 6(c)). The bearing portion 2b is sandwiched between the flange portion 4b of the frictional resistance part 4 and the flanged washer 8. A flanged washer 8 and a retaining ring 9 for preventing the shaft 3 from coming off are attached to the shaft 3.

Figure 7:
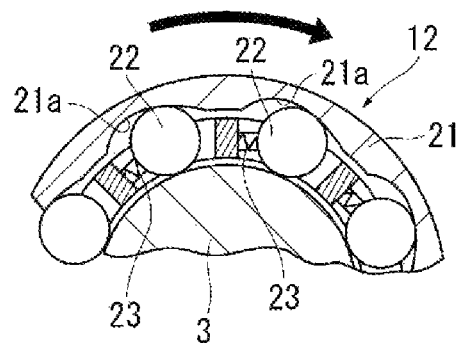
FIGS. 7(a) and 7(b) are cross-sectional views of the one-way clutch of the one-way braking hinge of this embodiment (FIG. 7(a) shows a case where an outer ring rotates clockwise, and FIG. 7(b) shows a case where the outer ring rotates counterclockwise).
Figure 7:
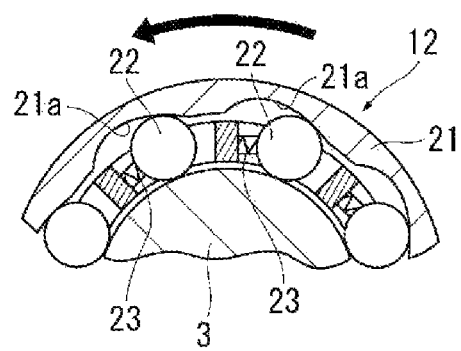

Reference numeral 12 in FIG. 3 is a one-way clutch. The shaft 3 is inserted into the one-way clutch 12. As shown in FIG. 7(a), the one-way clutch 12 includes an outer ring 21 having a plurality of cam surfaces 21a formed on its inner surface, rolling elements 22, such as needles and rollers, which are accommodated in wedge-shaped spaces between the cam surfaces 21a of the outer ring 21 and the shaft 3, and springs 23 that bias the rolling elements 22 toward a side of a shallow groove of the wedge-shaped space. As shown in FIG. 7(a), when the outer ring 21 rotates clockwise with respect to the shaft 3, the rolling elements 22 move from the side of the shallow groove to a side of a deep groove of the cam surfaces 21a, and the rolling elements 22 are separated from the cam surfaces 21a and the outer ring 21 rotates freely with respect to the shaft 3. On the other hand, as shown in FIG. 7(b), when the outer ring 21 rotates counterclockwise with respect to the shaft 3, spring force of the spring 23 advances the rolling elements 22 to the side of the shallow groove of the cam surfaces 21a, and wedge action between the cam surface 21a and the shaft 3 causes the shaft 3 to rotate together with the outer ring 21.

As shown in FIG. 3, the one-way clutch 12 is fixed to a position adjusting member 11. A clutch receiving hole 11a is formed in the position adjusting member 11. The outer ring 21 of the one-way clutch 12 is press-fitted into the clutch receiving hole 11a of the position adjusting member 11. An axial length of the one-way clutch 12 is somewhat shorter than an axial length of the position adjusting member 11 (see FIG. 6(b)). The position adjusting member 11 is arranged between the pair of the cylindrical portions 1a of the first leaf 1. A small gaps is formed between the position adjusting member 11 and the cylindrical portion 1a (see FIG. 6(a)).

The position adjusting member 11 is position-adjustably coupled to the second leaf 2. When the second leaf 2 rotates in the opening direction, the one-way clutch 12 rotates in the opening direction together with the second leaf 2. At this time, since the one-way clutch 12 rotates freely with respect to the shaft 3, the second leaf 2 rotates freely. On the other hand, when the second leaf 2 rotates in the closing direction, the one-way clutch 12 rotates in the closing direction together with the second leaf 2, and the shaft 3 held by the one-way clutch 12 rotates in the closing direction. Since the rotation of the shaft 3 in the closing direction is braked by the frictional resistance part 4, the rotation of the second leaf 2 in the closing direction is braked.

Figure 5:
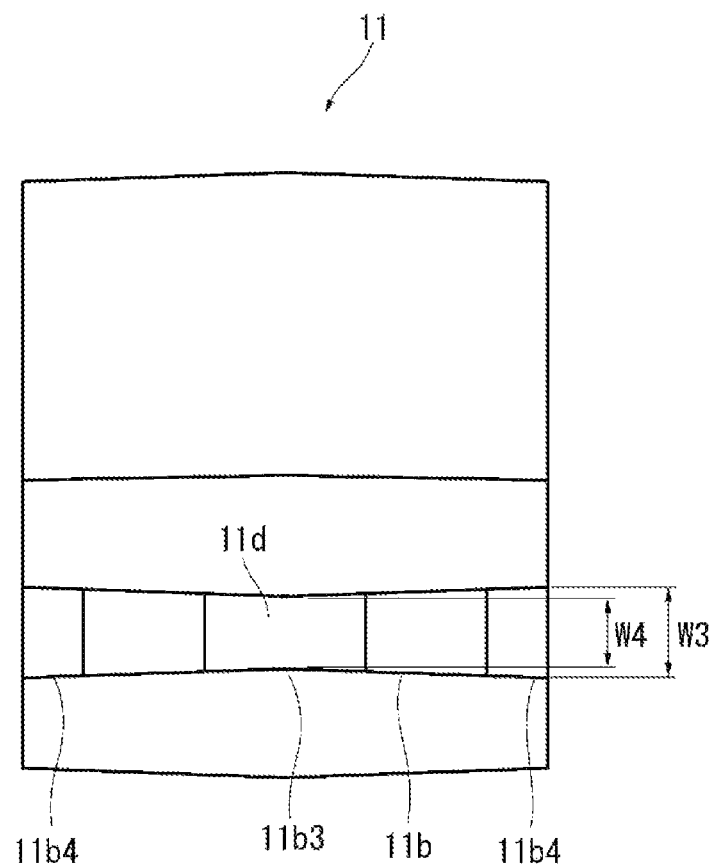
FIG. 5 is a front view (a front view seen from the side of the second leaf) of a position adjusting member of the one-way braking hinge of this embodiment.

The position adjusting member 11 has an axis-perpendicular cross-sectional profile that is a combination of an arc and a substantially triangular shape and has a predetermined length in the axial direction. A groove 11b into which the second leaf 2 is inserted is formed in a sharpened portion of the position adjusting member 11. The groove 11b is a dovetail groove whose wall surface is formed in an inverted V shape when viewed in cross section (see FIG. 8(b2)), and a width W1 of an innermost portion 11b2 of the groove 11b is larger than a width W2 of an inlet portion 11b1. Further, as shown in the front view of the position adjusting member 11 seen from the side of the second leaf 2 in FIG. 5, a width W3 of both axial end portions 11b4 of the groove 11b is larger than a width W4 of an axial central portion 11b3 of the groove 11b. In the axial central portion 11b3 of the groove 11b, the width W4 of the inlet portion 11b1 of the groove 11b is matched with the thickness of the second leaf 2 (see FIG. 8(b2)). A depth d of the groove 11b shown in FIG. 8(b2) is set so that a gap is formed between a bottom surface 11c of the groove 11b and the second leaf 2.

Figure 8:
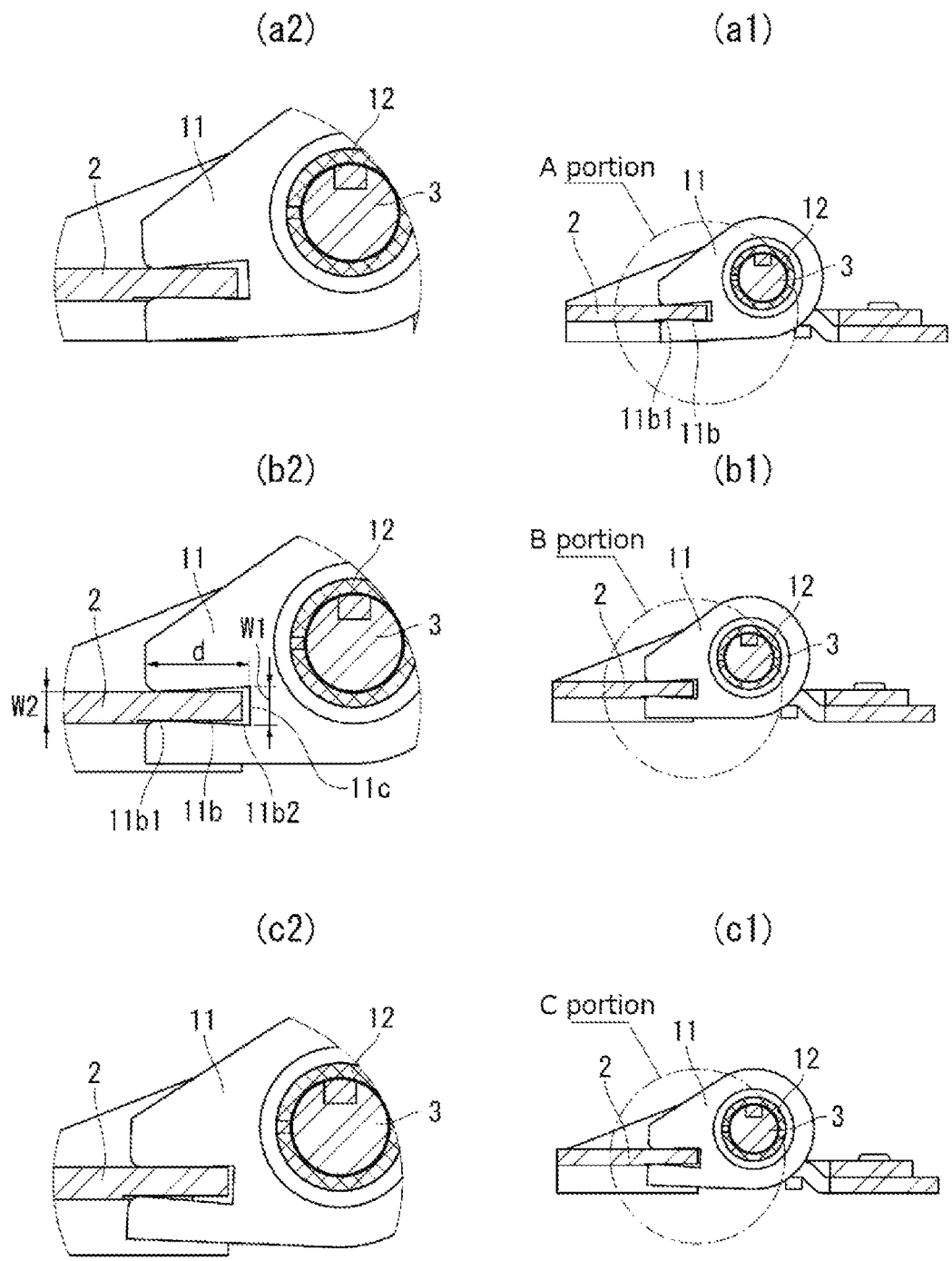
FIGS. 8(a1), 8(a2), 8(b1), 8(b2), 8(c1) and 8(c2) are cross-sectional views perpendicular to an axis of the position adjusting member of the one-way braking hinge of this embodiment (FIGS. 8(a1) and 8(a2) show a case where the position adjusting member is tilted counterclockwise, FIGS. 8(b1) and 8(b2) show a neutral position of the position adjusting member, and FIGS. 8(c1) and 8(c2) show a case where the position adjusting member is tilted clockwise).

The one-way clutch 12 fixed to the position adjusting member 11 is adjustable in position with respect to the second leaf 2. FIG. 8 shows the cross-sectional view perpendicular to an axis of the position adjusting member 11. FIG. 8(b1) shows a neutral position of the position adjusting member 11, FIG. 8(a1) shows a case where the position adjusting member 11 is tilted counterclockwise, and FIG. 8(c1) shows a case where the position adjusting member 11 is tilted clockwise. As shown in FIG. 8(a1), when the position adjusting member 11 is tilted counterclockwise with respect to the second leaf 2 about the inlet portion 11b1 of the groove 1ib, the one-way clutch 12 moves upward. As shown in FIG. 8(c1), when the position adjusting member 11 is tilted clockwise with respect to the second leaf 2, the one-way clutch 12 moves downward. Therefore, the shaft 3 and the one-way clutch 12 can be vertically aligned. Further, when the position adjusting member 11 moves in the left-right direction (the depth direction of the groove 1ib) with respect to the second leaf 2, the one-way clutch 12 moves in the left-right direction. Therefore, the shaft 3 and the one-way clutch 12 can be horizontally aligned.

Figure 9:
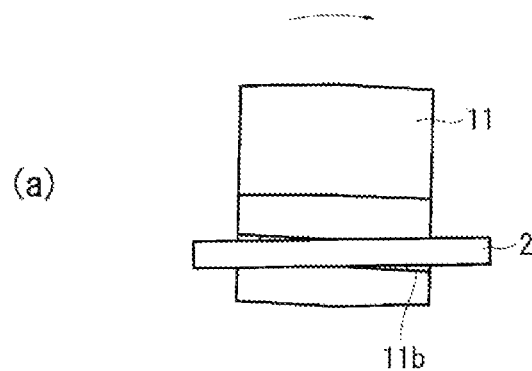
FIGS. 9(a), 9(b) and 9(c) are front views of the position adjusting member of the one-way braking hinge of this embodiment (FIG. 9(b) shows a neutral position of the position adjusting member, FIG. 9(a) shows a case where the position adjusting member is tilted clockwise, and FIG. 9(c) shows a case where the position adjusting member is tilted counterclockwise).
Figure 9:
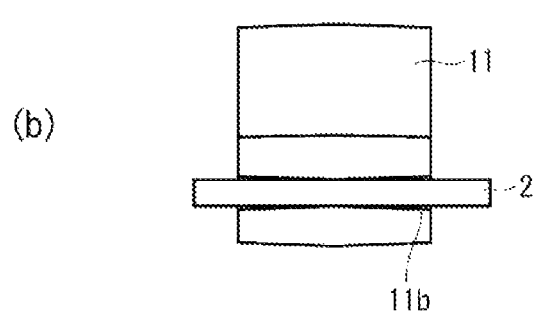
Figure 9:
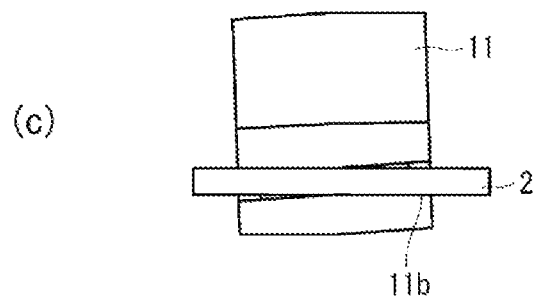

FIG. 9 shows a front view of the position adjusting member 11 viewed from the side of the second leaf 2. FIG. 9(b) shows the neutral position of the position adjusting member 11, FIG. 9(a) shows a case where the position adjusting member 11 is tilted clockwise with respect to the second leaf 2, and FIG. 9(c) shows a case where the position adjusting member is tilted counterclockwise with respect to the second leaf 2. As shown in FIGS. 9(a) and 9(c), when the position adjusting member 11 is tilted with respect to the second leaf 2, the one-way clutch 12 is tilted similarly to the position adjusting member 11. Therefore, tilt deviation between the shaft 3 and the one-way clutch 12 can be absorbed.

As shown in FIG. 3, the second leaf 2 is formed with a stepped engaging concave portion 2d. The engaging concave portion 2d is formed in a symmetrical concave shape having, for example, two steps. Inside the groove 11b of the position adjusting member 11, a stepped convex portion 11d complementary to the engaging concave portion 2d is formed. The convex portion 11d is formed in a symmetrical convex shape having, for example, two steps. The axial movement of the position adjusting member 11 with respect to the second leaf 2 is restricted by fitting the convex portion 11d of the position adjusting member 11 into the engaging concave portion 2d of the second leaf 2. Alternatively, the second leaf 2 may be formed with an engaging convex portion, and the position adjusting member 11 may be formed with a concave portion to fit the engaging concave portion.

The configuration and operation of the one-way braking hinge 10 of this embodiment have been described above. The one-way braking hinge 10 of this embodiment has the following effects.

Since the position adjusting member 11 to which the one-way clutch 12 is fixed is position-adjustably coupled to the second leaf 2, the shaft 3 and the one-way clutch 12 can be self-aligned.

The shaft 3 and the one-way clutch 12 can be self-aligned with a simple structure in which the position adjusting member 11 is formed with the groove 11b and the second leaf 2 is inserted into the groove 11b.

Since the width W1 of the innermost portion 11b2 of the groove 11b of the position adjusting member 11 is larger than the width W2 of the inlet portion 11b1 of the groove 11b, the position adjusting member 11 can be tilted with respect to the second leaf 2. In addition, it is possible to prevent rattling between the second leaf 2 and the position adjusting member 11 after the hinge device 10 is assembled. Therefore, a time lag between the rotation of the second leaf 2 and the rotation of the one-way clutch 12 can be eliminated.

Since the width W3 of the axial end portions 11b4 of the groove 11b of the position adjusting member 11 is larger than the width W4 of the axial central portion 11b3 of the groove 11b, the tilt deviation between the shaft 3 and the one-way clutch 12 can be absorbed.

Since the position adjusting member 11 is formed with the convex portion 11d and the second leaf 2 is formed with the engaging concave portion 2d that fits into the convex portion 11d, the axial movement of the position adjusting member 11 with respect to the second leaf 2 can be restricted.

Since the one-way clutch 12 is arranged between the pair of frictional resistance parts 4, the shaft 3 can be stably supported by the pair of frictional resistance parts 4.

Modified Example

Figure 10:
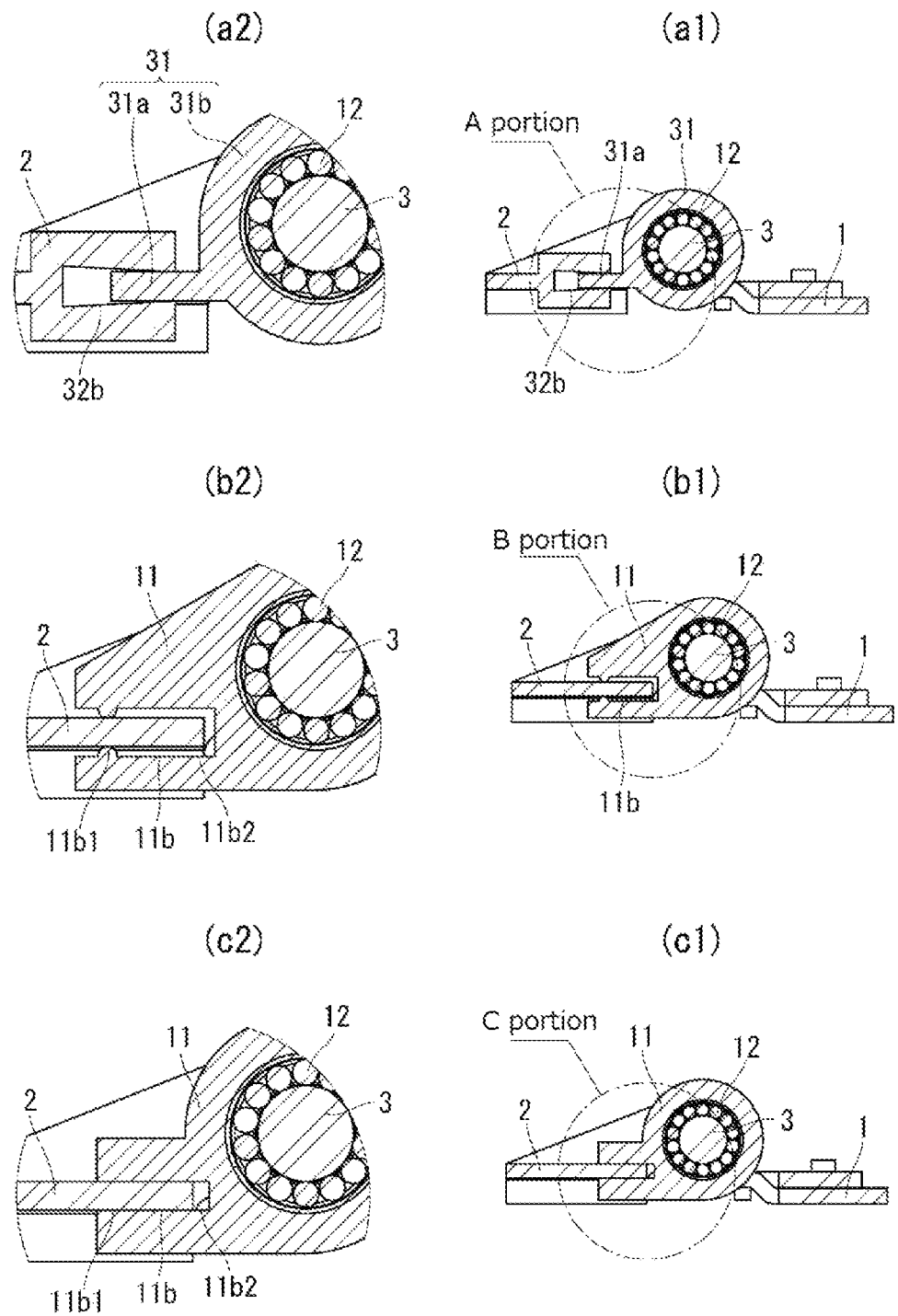
FIGS. 10(a1) and 10(a2) show a modified example in which a groove is provided on the side of the second leaf, FIGS. 10(b1) and 10(b2) show a modified example of the groove of the position adjusting member, and FIGS. 10(c1) and 10(c2) show other modified example of the groove of the position adjusting member.

FIGS. 10(a1) and 10(a2) show a modified example in which a groove 32b is provided on the side of the second leaf 2. In the first embodiment, the position adjusting member 11 is provided with the groove 11b for receiving the second leaf 2, but in this modified example, the second leaf 2 is provided with a groove 32b for receiving the position adjusting member 31. The groove 32b is a dovetail groove like the groove 11b of the first embodiment. The position adjusting member 31 includes a cylindrical portion 31b into which the one-way clutch 12 is press-fitted, and an extension portion 31a protruding outward from the cylindrical portion 31b. A width of an inlet portion of the groove 32b is matched with a thickness of the extension portion 31a of the position adjusting member 31. The width of the groove 32b behind the inlet portion is larger than the thickness of the extension 31a of the position adjusting member 31. The groove 32b may be formed in the second leaf 2 as in this modified example. The configurations of the one-way clutch 12, the shaft 3, and the first leaf 1 are the same as those of the first embodiment, so the same reference numerals are given and the description thereof is omitted.

FIGS. 10(b1) and (b2) show a modified example of the groove 11b of the position adjusting member 11. In the first embodiment, the groove 11b of the position adjusting member 11 is formed as a dovetail groove. In this modified example, the pair of wall surfaces of the groove 11b are formed parallel to each other. A pair of protrusions are formed at the inlet portion 11b1 of the groove 11b. The width of the inlet portion 11b1 of the groove 11b, that is, the distance between the pair of protrusions is matched with the thickness of the second leaf 2. The width of the inner portion 11b2 of the groove 11b from the inlet portion 11b1 is larger than the thickness of the second leaf 2. The groove 11b may be configured as in this modified example.

FIGS. 10(c1) and (c2) show other modified example of the groove 11b of the position adjusting member 11. In this modified example, the width of the groove 11b is constant from the inlet portion 11b1 to the innermost portion 11b2, and the pair of wall surfaces of the groove 11b are formed parallel to each other. The second leaf 2 matching the width of the groove 11b is inserted into the groove 11b. As in this modified example, the one-way clutch 12 and the shaft 3 may be aligned only in the left-right direction of FIG. 10(c2).

Second Embodiment

Figure 11:
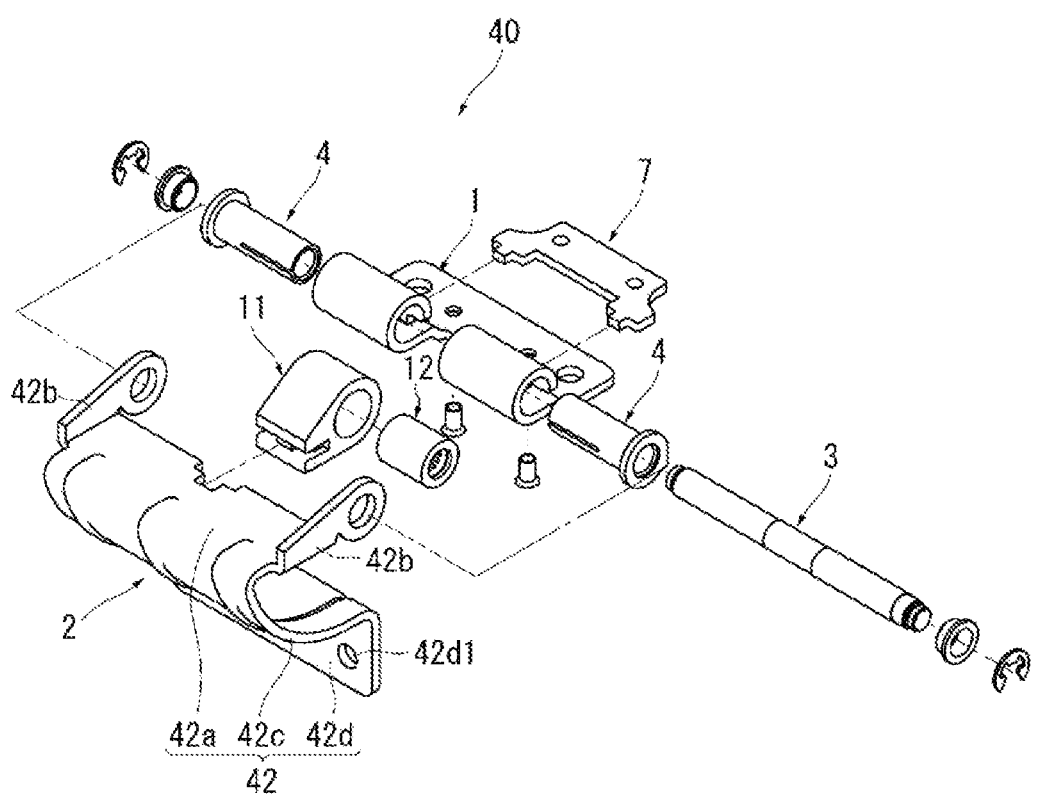
FIG. 11 is an exploded perspective view of the one-way braking hinge according to a second embodiment of the present invention.

FIG. 11 is an exploded perspective view of the one-way braking hinge 40 of the second embodiment of the present invention. The configurations of the first leaf 1, the frictional resistance part 4, the locking member 7, the shaft 3, the one-way clutch 12, and the position adjusting member 11 are the same as those of the first embodiment shown in FIG. 3, so the same reference numerals are given and the description thereof is omitted.

In the second embodiment, the shape of the body portion 42 of the second leaf 2 is different from that in the first embodiment. The body portion 42 includes a base portion 42a integrally formed with bearing portions 42b and to which the position adjusting member 11 is coupled, an extension portion 42c that is continuous with the base portion 42a and has a substantially ¼ arc-shaped cross section and a mounting portion 42d that bends at a substantially right angle from the extension portion 42c. Mounting holes 42d1 for mounting to the lid body d are formed in the mounting portion 42d.

Figure 12:
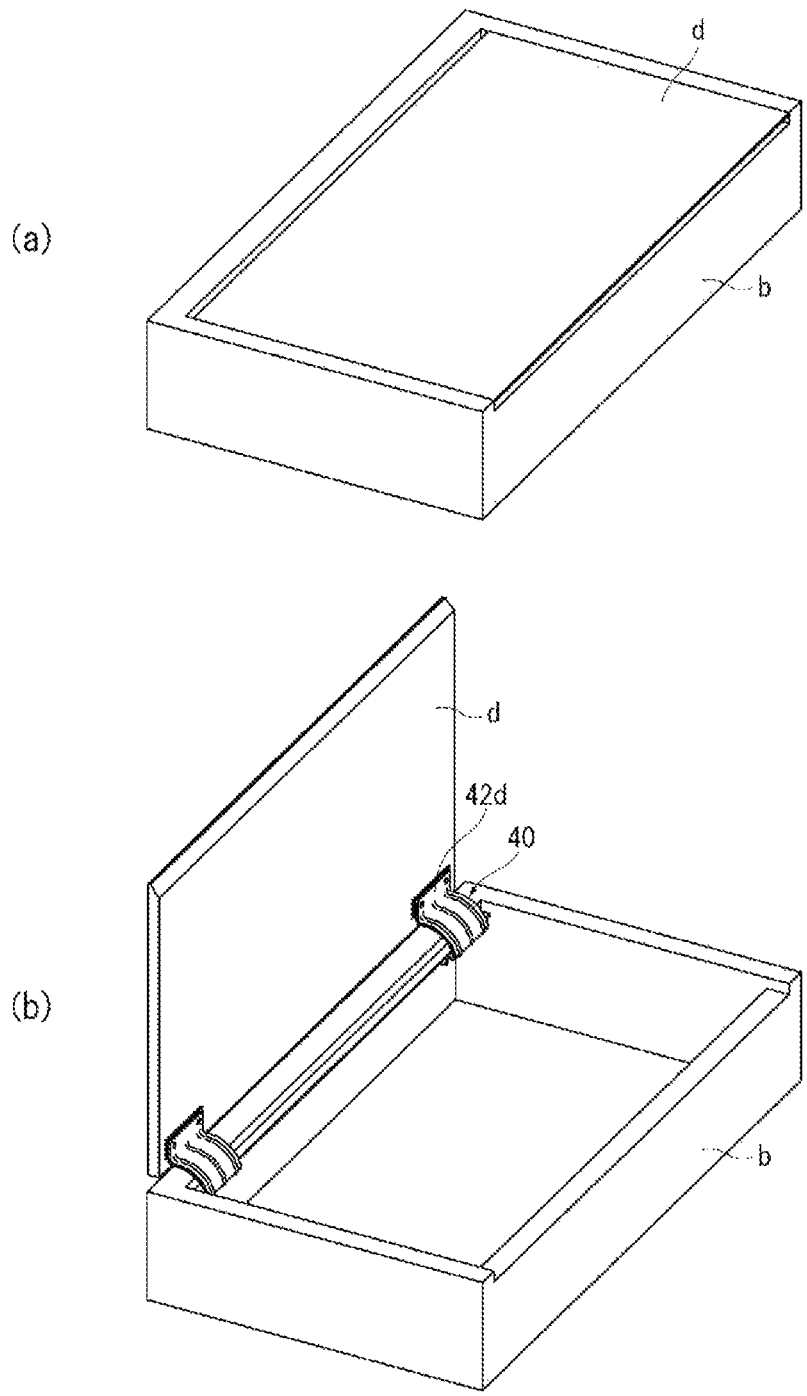
FIGS. 12(a) and 12(b) are diagrams showing an example in which the one-way braking hinge according to the second embodiment of the present invention is attached to the housing (FIG. 12(a) shows the closed position of the lid body, and FIG. 12(b) shows an opened position of the lid body).

FIG. 12 shows an example in which the one-way braking hinge 40 of the second embodiment is attached to the housing. The first leaf 1 is attached to a lower surface of a frame of the main body b. The mounting portion 42d of the second leaf 2 is attached to the lid body d. By forming the body portion 42 of the second leaf 2 as in this embodiment, as shown in FIG. 12(a), the hinge 40 can be hidden in the closed position of the lid body d, improving the appearance.

Third Embodiment

Figure 13:
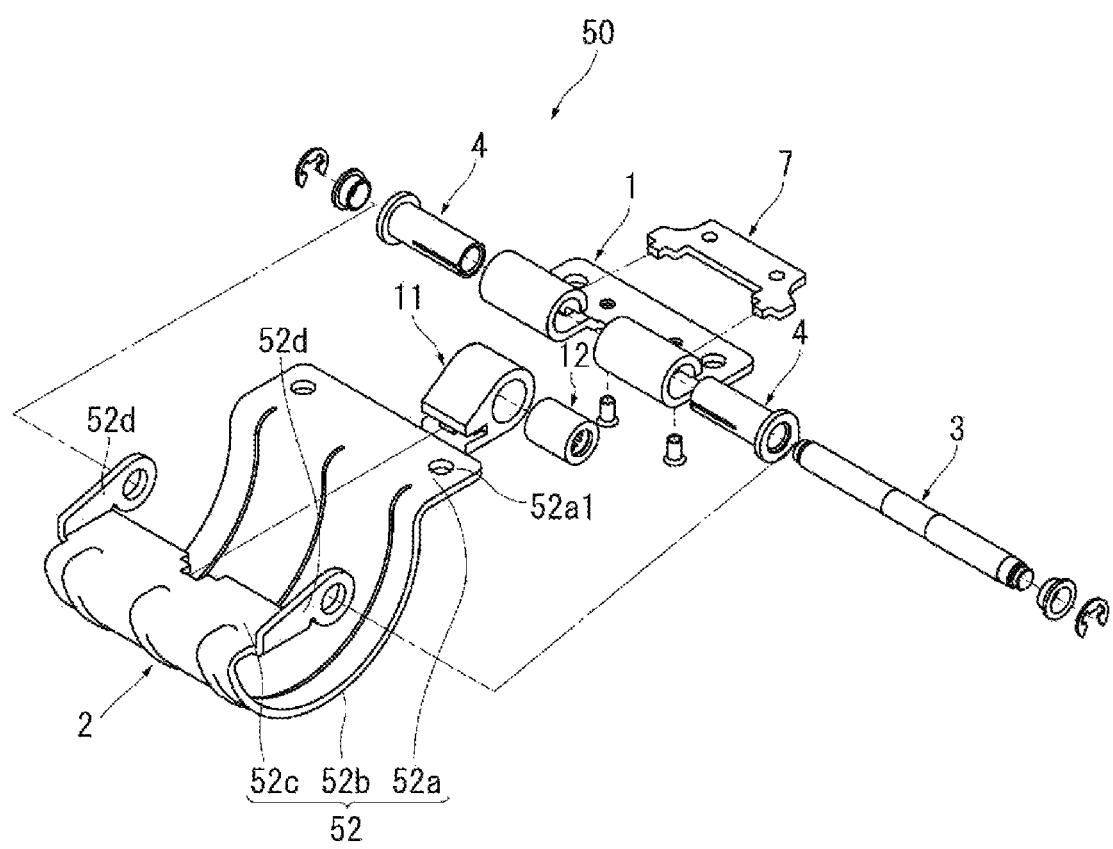
FIG. 13 is an exploded perspective view of the one-way braking hinge according to a third embodiment of the present invention.

FIG. 13 is an exploded perspective view of the one-way braking hinge 50 of the third embodiment of the present invention. The configurations of the first leaf 1, the frictional resistance part 4, the locking member 7, the shaft 3, the one-way clutch 12, and the position adjusting member 11 are the same as those of the first embodiment shown in FIG. 3, so the same reference numerals are given and the description thereof is omitted.

In the third embodiment, the shape of the body portion 52 of the second leaf 2 is different from that in the first embodiment. The body portion 52 includes a mounting portion 52a, an extension portion 52b that is continuous with the mounting portion 52a and has a substantially ½ arc-shaped cross section and a base portion 52c that bends from the extension portion 52b toward the mounting portion 52a and is integrally formed with the bearing portions 52d. Mounting holes 52a1 for mounting to the lid body d are formed in the mounting portion 52a. The position adjusting member 11 is coupled to the base portion 52c.

Figure 14:
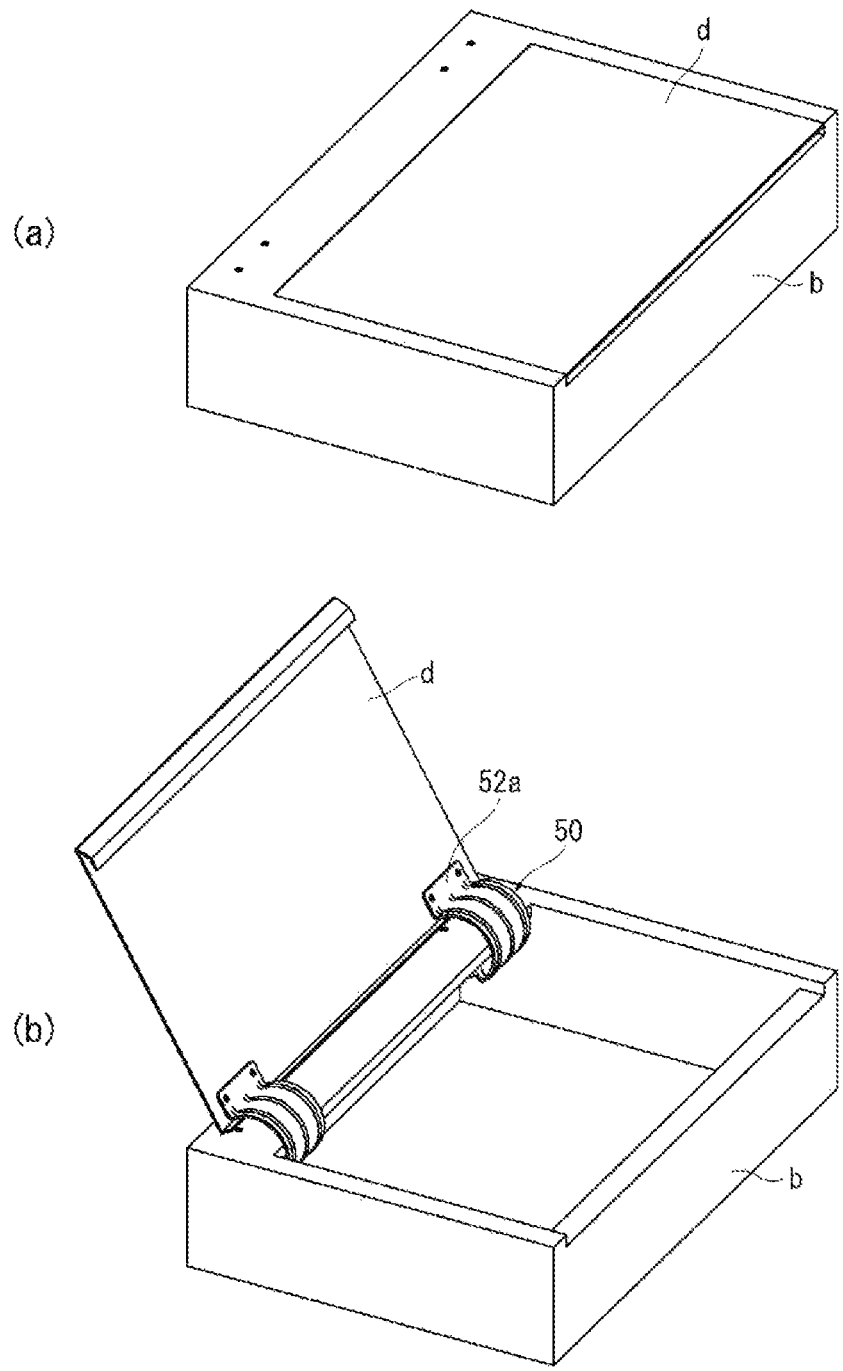
FIGS. 14(a) and 14(b) are diagrams showing an example in which the one-way braking hinge according to the third embodiment of the present invention is attached to the housing (FIG. 14(a) shows the closed position of the lid body, and FIG. 14(b) shows the opened position of the lid body).

FIG. 14 shows an example in which the one-way braking hinge 50 of the third embodiment is attached to the housing. The first leaf 1 is attached to the lower surface of the frame of the main body b. The mounting portion 52a of the second leaf 2 is attached to the lid body d. By forming the second leaf 2 as in this embodiment, as shown in FIG. 14(a), the one-way braking hinge 50 can be hidden in the closed position of the lid body d. Also, as shown in FIG. 14(b), the maximum opening angle of the lid body d can be increased.

Fourth Embodiment

Figure 15:
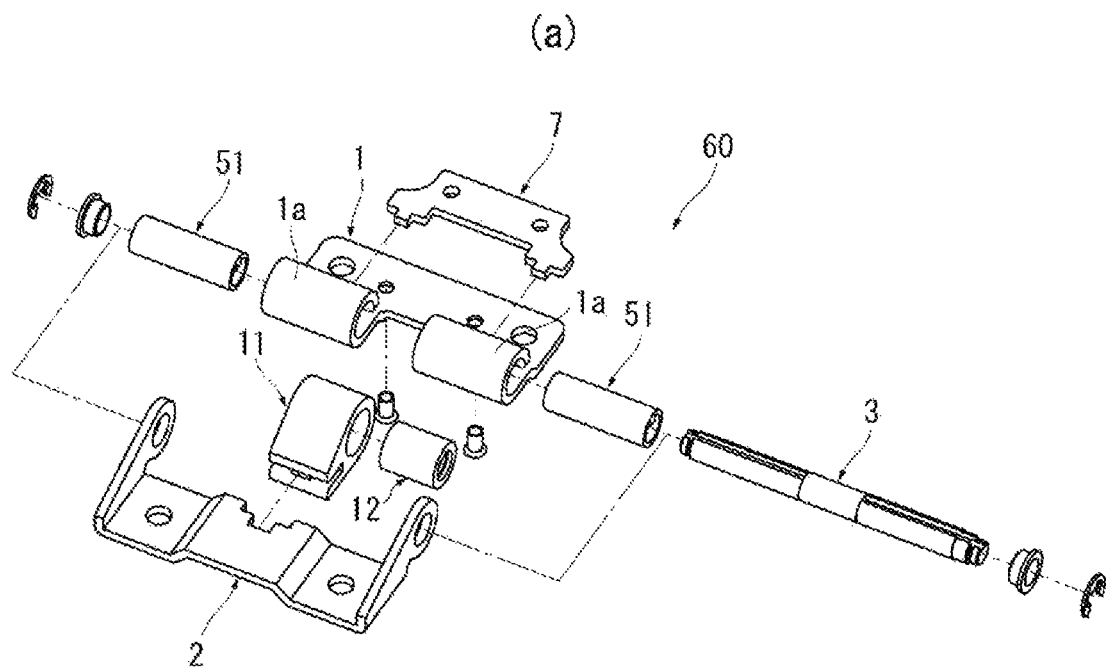
FIG. 15(a) is an exploded perspective view of the one-way braking hinge according to a fourth embodiment of the present invention.
FIG. 15(b) is a sectional view of a damper resistor.
Figure 15:
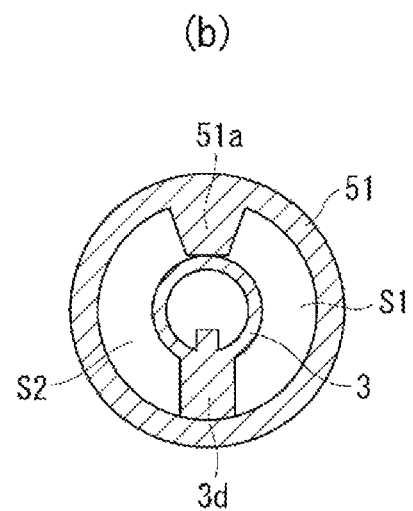

FIG. 15 is an exploded perspective view of the one-way braking hinge 60 of the fourth embodiment of the present invention. The configurations of the first leaf 1, the frictional resistance part 4, the locking member 7, the shaft 3, the one-way clutch 12, the position adjusting member 11 and the second leaf 2 are the same as those of the first embodiment shown in FIG. 3, so the same reference numerals are given and the description thereof is omitted.

In the first embodiment, the frictional resistance part 4 is used as the resistance part, whereas in the fourth embodiment, damper resistors 51 are used as the resistance part. The shaft 3 is rotatably supported by the cylindrical portions 1a of the first leaf 1 via the damper resister 51. When the shaft 3 rotates, a damping force is generated to brake the rotation of the shaft 3.

As shown in FIG. 15(b), the damper resister 51 is formed in a cylindrical shape and has a partition wall 51a inside. The shaft 3 is provided with a radially protruding partition wall 3d. The partition wall 51a of the damper resister 51 and the partition wall 3d of the shaft 3 partition the space between the damper resister 51 and the shaft 3 into a first chamber S1 and a second chamber S2. The first chamber S1 and the second chamber S2 are filled with hydraulic fluid. When the shaft 3 rotates, one of the first chamber S1 and the second chamber S2 becomes a high pressure chamber and the other becomes a low pressure chamber. At this time, the hydraulic fluid flows from the high pressure chamber to the low pressure chamber through the narrow gap between the damper resister 51 and the shaft 3, so that the braking force that resists the rotation of the shaft 3 is generated.

This specification is based on Japanese Patent Application No. 2020-133722 filed on Aug. 6, 2020, which is hereby incorporated herein by reference in its entirety.

EXPLANATION OF REFERENCE NUMERALS

1: First leaf
1a: Cylindrical portion of the first leaf
2: second leaf
2d: Engaging concave portion
3: Shaft
4: Frictional resistance part (resistance part)
10: One-way braking hinge
11: Position adjusting member
11b: Groove
11b1: Inlet portion of groove
11b2: Innermost portion of groove
11b3: Axial central portion of groove
11b4: Both axial end portions of groove
11d: Convex portion
12: One-way clutch
31: Position adjusting member
32b: Groove
40: One-way braking hinge
50: One-way braking hinge
51: Damper resistor (resistance part)

What is claimed is:

1. A one-way braking hinge comprising:
a first leaf;
a shaft rotatably supported by the first leaf;
at least one resistance part that resists rotation of the shaft;
a second leaf rotatably coupled to the shaft;
a one-way clutch into which the shaft is inserted, and
a position adjusting member to which the one-way clutch is fixed;
wherein the position adjusting member is position-adjustably coupled to the second leaf, and the position adjusting member moves relative to the second leaf, so that the shaft and the one-way clutch are automatically aligned.

2. The one-way braking hinge as claimed in claim 1, wherein one of the position adjusting member or the second leaf is formed with a groove into which the other of the position adjusting member or the second leaf is inserted.

3. The one-way braking hinge as claimed in claim 2, wherein a width of an innermost portion of the groove is larger than a width of an inlet portion of the groove.

4. The one-way braking hinge as claimed in claim 2, wherein a width of both ends of the groove in an axial direction is larger than a width of a central portion of the groove in the axial direction.

5. The one-way braking hinge as claimed in claim 2, wherein in order to restrict an axial movement of the position adjusting member with respect to the second leaf, the one of the position adjusting member or the second leaf is formed with a convex portion or a concave portion, and the other of the position adjusting member or the second leaf is provided with an engaging concave portion or an engaging convex portion that fits into the convex portion or the concave portion.

6. The one-way braking hinge as claimed in claim 1, wherein a pair of the resistance parts are attached to a pair of cylindrical portions of the first leaf, and
wherein the one-way clutch is arranged between the pair of cylindrical portions.

* * * * *